United States Patent
Proctor, Jr.

(10) Patent No.: US 7,394,791 B2
(45) Date of Patent: Jul. 1, 2008

(54) MULTI-DETECTION OF HEARTBEAT TO REDUCE ERROR PROBABILITY

(75) Inventor: James A. Proctor, Jr., Melbourne Beach, FL (US)

(73) Assignee: InterDigital Technology Corporation, Wilmington, DE (US)

( * ) Notice: Subject to any disclaimer, the term of this patent is extended or adjusted under 35 U.S.C. 154(b) by 948 days.

(21) Appl. No.: 10/171,378

(22) Filed: Jun. 12, 2002

(65) Prior Publication Data

US 2003/0095517 A1 May 22, 2003

Related U.S. Application Data (63) Continuation-in-part of application No. 09/997,621, filed on Nov. 29, 2001, now Pat. No. 6,678,260, and a continuation-in-part of application No. 09/775,305, filed on Feb. 1, 2001, now Pat. No. 7,079,523, which is a continuation of application No. 09/730,376, filed on Dec. 5, 2000, now Pat. No. 6,707,804, which is a continuation of application No. 09/088,413, filed on Jun. 1, 1998, now Pat. No. 6,222,832, which is a continuation-in-part of application No. 08/992,760, filed on Dec. 17, 1997, now Pat. No. 6,081,536, and a continuation-in-part of application No. 08/992,759, filed on Dec. 17, 1997, now Pat. No. 6,151,332, and a continuation-in-part of application No. 09/030,049, filed on Feb. 24, 1998, now Pat. No. 6,236,647.

(60) Provisional application No. 60/378,903, filed on May 7, 2002, provisional application No. 60/378,697, filed on May 7, 2002, provisional application No. 60/297,987, filed on Jun. 13, 2001, provisional application No. 60/297,925, filed on Jun. 13, 2001.

(51) Int. Cl.
*H04B 7/216* (2006.01)
*H04L 12/66* (2006.01)

(52) U.S. Cl. .................................... 370/335; 370/342
(58) Field of Classification Search ......... 370/328–338, 370/347, 441, 445, 235, 442, 461, 352, 252, 370/465, 342, 320, 230, 350, 356, 389; 455/421–425, 455/445, 454, 466, 509, 517, 418; 375/344, 375/130, 222, 142; 379/156, 198, 142, 165; 342/465; 709/203, 217, 219
See application file for complete search history.

(56) References Cited

U.S. PATENT DOCUMENTS 4,107,469 A 8/1978 Jenkins (Continued)

FOREIGN PATENT DOCUMENTS

EP 0526106 2/1993

(Continued)

OTHER PUBLICATIONS

Bell Labs Technical Journal, Lucent Technologies, vol. 2, No. 3, Summer 1997.

(Continued)

*Primary Examiner*—Wing Chan
*Assistant Examiner*—Prenell Jones
(74) *Attorney, Agent, or Firm*—Volpe and Koenig, P.C.

(57) ABSTRACT

A communications system improves performance of detecting a signal having an indication of a request to change communications states by making at least two positive identifications of the request in a given time frame. The system may further improve performance by applying a difference in power levels for a non-request state (i.e., steady state or 'control hold' state) versus a request state (i.e., 'request to change' state). In one particular application, a base station determines a request to change communications states with a reasonably high probability of detection and a reasonably low probability of false detection. The system has a reduced number of erroneous communications states, such as erroneous traffic channel allocations. The detection technique is compatible with 1xEV-DV systems and I-CDMA systems, but general enough to support systems employing various other communications protocols used in wired and wireless communications systems.

58 Claims, 7 Drawing Sheets

U.S. PATENT DOCUMENTS

| | | | |
|---|---|---|---|
| 4,577,316 A | 3/1986 | Schiff | |
| 4,625,308 A | 11/1986 | Kim et al. | |
| 4,675,863 A | 6/1987 | Paneth et al. | |
| 4,817,089 A | 3/1989 | Paneth et al. | |
| 4,862,453 A | 8/1989 | West et al. | |
| 4,866,709 A | 9/1989 | West et al. | |
| 4,912,705 A | 3/1990 | Paneth et al. | |
| 4,954,950 A | 9/1990 | Freeman et al. | |
| 5,022,024 A | 6/1991 | Paneth et al. | |
| 5,027,348 A | 6/1991 | Curry, Jr. | |
| 5,103,459 A | 4/1992 | Gilhousen et al. | |
| 5,114,375 A | 5/1992 | Wellhausen et al. | |
| 5,115,309 A | 5/1992 | Hang | |
| 5,124,981 A * | 6/1992 | Golding | 370/440 |
| 5,282,222 A | 1/1994 | Fattouche et al. | |
| 5,325,419 A | 6/1994 | Connolly et al. | |
| 5,373,502 A | 12/1994 | Turban | |
| 5,394,473 A | 2/1995 | Davidson | |
| 5,412,429 A | 5/1995 | Glover | |
| 5,414,728 A | 5/1995 | Zehavi | |
| 5,442,625 A | 8/1995 | Gitlin et al. | |
| 5,446,727 A | 8/1995 | Bruckert et al. | |
| 5,471,463 A | 11/1995 | Hulbert | |
| 5,481,533 A | 1/1996 | Honig et al. | |
| 5,487,180 A | 1/1996 | Ohtake | |
| 5,490,136 A | 2/1996 | Sereno et al. | |
| 5,493,569 A * | 2/1996 | Buchholz et al. | 370/442 |
| 5,511,068 A | 4/1996 | Sato | |
| 5,537,414 A * | 7/1996 | Takiyasu et al. | 370/347 |
| 5,550,828 A | 8/1996 | Gries et al. | 370/95.1 |
| 5,577,022 A | 11/1996 | Padovani et al. | |
| 5,581,575 A | 12/1996 | Zehavi et al. | |
| 5,585,850 A | 12/1996 | Schwaller | |
| 5,586,119 A | 12/1996 | Scribano et al. | |
| 5,592,468 A * | 1/1997 | Sato | 370/252 |
| 5,592,470 A | 1/1997 | Rudrapatna et al. | |
| 5,592,471 A | 1/1997 | Briskman | |
| 5,598,416 A | 1/1997 | Yamada et al. | |
| 5,617,423 A | 4/1997 | Li et al. | |
| 5,619,492 A | 4/1997 | Press et al. | |
| 5,642,348 A | 6/1997 | Barzegar et al. | |
| 5,655,001 A | 8/1997 | Cline et al. | |
| 5,657,358 A | 8/1997 | Panech et al. | |
| 5,663,958 A | 9/1997 | Ward | |
| 5,663,990 A | 9/1997 | Bolgiano et al. | |
| 5,673,259 A | 9/1997 | Quick, Jr. | |
| 5,687,194 A | 11/1997 | Paneth et al. | |
| 5,689,502 A | 11/1997 | Scott | |
| 5,697,059 A | 12/1997 | Carney | |
| 5,699,364 A | 12/1997 | Sato et al. | |
| 5,734,646 A | 3/1998 | I et al. | |
| 5,742,592 A | 4/1998 | Scholefield et al. | |
| 5,745,484 A | 4/1998 | Scott | |
| 5,758,288 A | 5/1998 | Dunn et al. | |
| 5,781,542 A | 7/1998 | Tanaka et al. | |
| 5,784,406 A | 7/1998 | DeJaco et al. | |
| 5,790,549 A | 8/1998 | Dent | |
| 5,790,551 A | 8/1998 | Chan | |
| 5,793,744 A | 8/1998 | Kanerva et al. | |
| 5,802,046 A | 9/1998 | Scott | |
| 5,828,659 A | 10/1998 | Teder et al. | |
| 5,828,662 A | 10/1998 | Jalali et al. | |
| 5,838,720 A | 11/1998 | Morelli | |
| 5,844,894 A | 12/1998 | Dent | |
| 5,856,971 A | 1/1999 | Gitlin et al. | |
| 5,859,840 A | 1/1999 | Tiedemann, Jr. et al. | |
| 5,859,879 A | 1/1999 | Bolgiano et al. | |
| 5,873,043 A | 2/1999 | Comer | |
| 5,881,060 A | 3/1999 | Morrow et al. | |
| 5,894,473 A | 4/1999 | Dent | 370/342 |
| 5,896,376 A | 4/1999 | Alperovich et al. | |
| 5,910,945 A | 6/1999 | Garrison et al. | |
| 5,914,950 A | 6/1999 | Tiedemann, Jr. et al. | |
| 5,915,216 A | 6/1999 | Lysejko | |
| 5,923,650 A | 7/1999 | Chen et al. | |
| 5,930,230 A | 7/1999 | Odenwalder et al. | |
| 5,950,131 A | 9/1999 | Vilmur | |
| 5,956,332 A | 9/1999 | Rasanen et al. | |
| 5,959,980 A | 9/1999 | Scott | |
| 5,963,559 A | 10/1999 | Ohki | |
| 5,966,374 A | 10/1999 | Rasanen | |
| 5,974,036 A | 10/1999 | Acharya et al. | 370/331 |
| 5,991,279 A | 11/1999 | Haugli et al. | |
| 5,991,618 A * | 11/1999 | Hall | 455/425 |
| 6,002,690 A | 12/1999 | Takayama et al. | |
| 6,005,855 A | 12/1999 | Zehavi et al. | |
| 6,011,800 A | 1/2000 | Nadgauda et al. | |
| 6,028,868 A | 2/2000 | Yeung et al. | |
| 6,038,450 A | 3/2000 | Brink et al. | |
| 6,049,538 A | 4/2000 | Scott | |
| 6,052,385 A | 4/2000 | Kanerva et al. | |
| 6,058,338 A | 5/2000 | Agashe et al. | |
| 6,064,678 A | 5/2000 | Sindhushayana et al. | |
| 6,069,883 A | 5/2000 | Ejzak et al. | |
| 6,078,572 A | 6/2000 | Tanno et al. | |
| 6,088,335 A | 7/2000 | I et al. | |
| 6,094,421 A | 7/2000 | Scott | |
| 6,094,576 A | 7/2000 | Häkkinen et al. | |
| 6,112,092 A | 8/2000 | Benveniste | |
| 6,134,233 A | 10/2000 | Kay | |
| 6,157,619 A | 12/2000 | Ozluturk et al. | |
| 6,161,013 A | 12/2000 | Anderson et al. | |
| 6,163,707 A | 12/2000 | Miller | |
| 6,185,184 B1 * | 2/2001 | Mattaway et al. | 370/230 |
| 6,195,362 B1 | 2/2001 | Darcie et al. | |
| 6,208,871 B1 | 3/2001 | Hall et al. | |
| 6,214,342 B1 | 4/2001 | Alberici et al. | |
| 6,215,798 B1 | 4/2001 | Carneheim et al. | |
| 6,222,828 B1 | 4/2001 | Ohlson et al. | |
| 6,222,832 B1 | 4/2001 | Proctor | |
| 6,226,527 B1 | 5/2001 | Dalsgaard et al. | |
| 6,233,439 B1 | 5/2001 | Jalali | |
| 6,236,674 B1 | 5/2001 | Morelli et al. | |
| 6,243,372 B1 | 6/2001 | Petch et al. | |
| 6,246,673 B1 | 6/2001 | Tiedemann, Jr. et al. | |
| 6,259,683 B1 | 7/2001 | Sekine et al. | |
| 6,262,980 B1 | 7/2001 | Leung et al. | |
| 6,263,013 B1 | 7/2001 | Hendrickson | |
| 6,269,075 B1 | 7/2001 | Tran | |
| 6,269,088 B1 | 7/2001 | Masui et al. | |
| 6,272,168 B1 | 8/2001 | Lomp et al. | |
| 6,285,665 B1 | 9/2001 | Chuah | |
| 6,292,474 B1 * | 9/2001 | Ali et al. | 370/328 |
| 6,307,840 B1 | 10/2001 | Wheatley, III et al. | |
| 6,314,300 B1 * | 11/2001 | Nakashima et al. | 455/517 |
| 6,353,412 B1 | 3/2002 | Soliman | |
| 6,366,570 B1 | 4/2002 | Bhagalia | |
| 6,373,830 B1 | 4/2002 | Ozluturk | |
| 6,373,834 B1 | 4/2002 | Lundh et al. | |
| 6,377,548 B1 | 4/2002 | Chuah | |
| 6,377,809 B1 | 4/2002 | Rezaiifar et al. | |
| 6,389,000 B1 | 5/2002 | Jou | |
| 6,396,804 B2 | 5/2002 | Odenwalder | |
| 6,418,148 B1 | 7/2002 | Kumar et al. | |
| 6,424,645 B1 | 7/2002 | Kawabata et al. | |
| 6,456,608 B1 | 9/2002 | Lomp | |
| 6,469,991 B1 | 10/2002 | Chuah | |
| 6,473,623 B1 | 10/2002 | Benveniste | |
| 6,504,830 B1 | 1/2003 | Östberg et al. | |
| 6,519,651 B1 | 2/2003 | Dillon | |
| 6,526,039 B1 | 2/2003 | Dahlman et al. | |
| 6,532,365 B1 | 3/2003 | Anderson et al. | |
| 6,545,986 B1 | 4/2003 | Stellakis | |
| 6,567,416 B1 | 5/2003 | Chuah | |

| | | |
|---|---|---|
| 6,570,865 B2 | 5/2003 | Masui et al. |
| 6,571,296 B1 | 5/2003 | Dillion |
| 6,574,211 B2 | 6/2003 | Padovani et al. |
| 6,597,913 B2 | 7/2003 | Natarajan |
| 6,611,231 B2 | 8/2003 | Crilly et al. |
| 7,027,420 B2 * | 4/2006 | Hamalainen ............ 370/335 |
| 7,079,523 B2 * | 7/2006 | Nelson et al. ............ 370/342 |
| 7,136,377 B1 * | 11/2006 | Tweedly et al. .......... 370/356 |
| 7,218,623 B1 * | 5/2007 | Proctor, Jr. ............... 370/335 |
| 7,221,664 B2 * | 5/2007 | Proctor, Jr. ............... 370/335 |
| 2001/0039191 A1 * | 11/2001 | Maierhofer ............... 455/466 |
| 2002/0045441 A1 * | 4/2002 | Ralston et al. ............ 455/418 |
| 2002/0097700 A1 | 7/2002 | Alastalo |
| 2003/0095517 A1 | 5/2003 | Proctor, Jr. |
| 2004/0005078 A1 | 1/2004 | Tillotson |
| 2004/0073803 A1 | 4/2004 | Keramane |

FOREIGN PATENT DOCUMENTS

| | | |
|---|---|---|
| EP | 0635949 | 1/1995 |
| EP | 0682423 | 11/1995 |
| EP | 0719062 | 6/1996 |
| EP | 07020309 | 7/1996 |
| EP | 0443061 | 8/1997 |
| FR | 2761557 | 10/1998 |
| GB | 2326524 | 12/1998 |
| JP | 02177643 | 7/1990 |
| JP | 07095151 | 4/1995 |
| TW | 566045 | 12/2003 |
| TW | 200536325 | 11/2005 |
| WO | 95/08900 | 3/1995 |
| WO | 96/08934 | 3/1996 |
| WO | 96/37081 | 11/1996 |
| WO | 97/23073 | 6/1997 |
| WO | 97/26726 | 7/1997 |
| WO | 97/46044 | 12/1997 |

OTHER PUBLICATIONS

Puleston, PPP Protocol Spoofing Control Protocol, Global Village Communication (UK) Ltd., Feb. 1996.

* cited by examiner

MULTI-DETECTION OF HEARTBEAT TO REDUCE ERROR PROBABILITY

RELATED APPLICATION(S)

This application claims the benefit of U.S. Provisional Application No. 60/378,903, filed on May 7, 2002; U.S. Provisional Application No. 60/297,987, filed on Jun. 13, 2001; U.S. Provisional Application No. 60/378,697, filed on May 7, 2002; U.S. Provisional Application No. 60/297,925, filed on Jun. 13, 2001; and is a continuation-in-part of U.S. application Ser. No. 09/775,305, filed Feb. 1, 2001 now U.S. Pat. No. 7,079,523, entitled "Maintenance Link Using Active/Standby Request Channels," by G. Rodney Nelson, Jr., et al; and U.S. application Ser. No. 09/997,621, filed Nov. 29, 2001 now U.S. Pat. No. 6,678,260, entitled "System and Method for Maintaining Wireless Channels Over a Reverse Link of a CDMA Wireless Communication System," by James A. Proctor, Jr., which is a continuation of application Ser. No. 09/730,376, filed Dec. 5, 2000 now U.S. Pat. No. 6,707,804, which is a continuation of application Ser. No. 09/088,413, filed Jun. 1, 1998, now U.S. Pat. No. 6,222,832, which is a continuation-in-part of application Ser. No. 08/992,760, filed Dec. 17, 1997, now U.S. Pat. No. 6,081,536 and a continuation-in-part of application Ser. No. 08/992,759, filed Dec. 17, 1997, now U.S. Pat. No. 6,151,332, and a continuation-in-part of application Ser. No. 09/030,049, filed Feb. 24, 1998, now U.S. Pat. No. 6,236,647, the entire teachings of the above applications are incorporated herein by reference.

BACKGROUND OF THE INVENTION

Increasing use of wireless telephones and personal computers has led to a corresponding increase in demand for advanced telecommunication services that were once thought practical only for specialized applications. In the 1980s, wireless voice communications became widely available through cellular telephone networks. Such services were thought at first to be for the exclusive province of businessmen because of expected high subscriber costs. The same was also true for access to remotely distributed computer networks, whereby until very recently, only business people and large institutions could afford the necessary computers and wireline access equipment.

As a result of the widespread availability of affordable new technologies, the general population now increasingly desires to have not only wireline access to networks such as the Internet and private intranets, but also wireless access as well. Wireless technology is particularly useful to users of portable computers, laptop computers, hand-held personal digital assistants and the like who prefer access to such networks without being tethered to a telephone line.

There still is no widely available satisfactory solution for providing low cost, high speed access to the Internet, private intranets, and other networks using the existing wireless infrastructure. This is most likely an artifact of several unfortunate circumstances. First, the typical manner of providing high speed data service in the business environment over a wireline network is not readily adaptable to the voice grade service available in most homes or offices. For example, such standard high speed data services do not necessarily lend themselves to efficient transmission over standard cellular wireless handsets because wireless networks were originally designed only to provide voice services. As a result, present day digital wireless communications systems are optimized for voice transmissions, although certain schemes such as CDMA do provide some measure of asymmetrical behavior for the accommodation of data transmissions. For example, the data rate specified by the Telecommunication Industry Association (TIA) for IS-95 on the forward traffic channel is adjustable in increments from 1.2 kbps up to 9.6 kbps for so-called Rate Set 1, and increments from 1.8 kbps up to 14.4 kbps for Rate Set 2. On the reverse link traffic channel, however, the data rate is fixed at 4.8 kbps.

At best, existing wireless systems therefore typically provide a radio channel that can accommodate maximum data rate transfers of 14.4 kilobits per second (kbps) over a forward link direction. Such a low data rate channel does not lend itself directly to transmitting data at rates of 28.8 or even 56.6 kbps that are now commonly available using inexpensive wireline modems, not to mention even higher rates such as the 128 kbps that are available with Integrated Services Digital Network (ISDN) type equipment. Data rates at these levels are rapidly becoming the minimum acceptable rates for activities such as browsing web pages.

Although wireline networks were known at the time when cellular systems were initially developed, for the most part, there was no provision made for such wireless systems to provide higher speed ISDN- or ADSL-grade data services over cellular network topologies.

In most wireless systems, there are many more potential users than radio channel resources. Some type of demand-based multiple access system is therefore required.

Whether the multiple access is provided by the traditional Frequency Division Multiple Access (FDMA) using analog modulation on a group of radio frequency carrier signals, or by schemes that permit sharing of a radio carrier frequency using Time Division Multiple Access (TDMA), or Code Division Multiple Access (CDMA), the nature of the radio spectrum is such that it is expected to be shared. This is quite dissimilar to the traditional environment supporting data transmissions in which the wireline medium is relatively inexpensive and is not typically intended to be shared.

Other factors to consider in the design of a wireless system are the characteristics of the data itself. For example, consider that access to web pages generally is burst-oriented, with asymmetrical data rate transmission requirements in a reverse and forward direction. In a common application, a user of a remote client computer first specifies the address of a web page to a browser program. The browser program then sends the web page address data, which is usually 100 bytes or less in length, over the network to a server computer. The server computer then responds with the content of the requested web page, which may include anywhere from 10 kilobytes to several megabytes of text, image, audio, or even video data. The user thereafter may spend several seconds or even several minutes reading the content of the page before downloading another web page.

In an office environment, the nature of most employees' computer work habits is typically to check a few web pages and then to do something else for an extended period of time, such as accessing locally stored data or even terminating use of the computer altogether. Therefore, even though such users may remain connected to the Internet or private intranet continuously during an entire day, actual use of the high speed data link is usually quite sporadic.

If wireless data transfer services supporting Internet connectivity are to coexist with wireless voice communication, it is becoming increasingly important to optimize the use of available resources in wireless CDMA systems. Frequency re-use and dynamic traffic channel allocation address some aspects of increasing the efficiency of high performance wireless CDMA communication systems, but there is still a need for more efficient utilization of available resources.

SUMMARY OF THE INVENTION

One way of making more efficient utilization of available resources is to ensure the resources are allocated in an error-free manner. For example, a base station should not allocate traffic channels to a field unit when a request for traffic channels has not been made. Similarly, the base station should allocate traffic channels to a field unit when a request has been made. Such a request is made by the field unit when the field unit is employed by a user to send traffic data to a remote network node.

In one application, a transmission of a marker in a time slot over one channel indicates a request by the corresponding field unit to go active. That is, transmission of a marker in an assigned time slot indicates that the field unit is requesting that reverse link traffic channels be assigned to the user for transmitting a data payload from the field unit to the base station. This presumes that the field unit is presently in the standby mode. Alternatively, a field unit transmits a marker over a second channel of the pair of reverse link channels to indicate that the field unit is not requesting to be placed in the active mode. For example, the field unit does not want to transmit data on a reverse link channel. Rather, the field unit requests to remain inactive but synchronized with the base station so that the field unit can immediately go active again at any moment.

In either case, the present invention improves performance for detecting a signal having a marker, or indication, of a request to change communications states, for example, by making a measurement of the indications to determine that a request to change communications states has been made. In one particular embodiment, the measurement includes at least two positive identifications of the request in a given time span. The system may further improve performance by applying a difference in power levels for a non-request state (i.e., steady state or 'control hold' state) versus a request state (i.e., 'request to change' communications state). The result may include a reduced number of erroneous communications states, such as erroneously assigned or allocated traffic channels.

In one particular application, a subscriber unit provides a heartbeat channel using a first code in a CDMA system in a heartbeat with request channel using a second code in the reverse link to a base station. The subscriber unit provides the signal(s) with a repetition and, optionally, different power levels in a manner that a base station employing the principles of the present invention determines a request to change communications states with a reasonably high probability of detection and a reasonably low probability of false detection.

The teachings of the present invention are compatible with 1xEV-DV systems and I-CDMA systems, but general enough to support systems employing various other communications protocols used in wired and wireless communications systems. Code Division Multiple Access (CDMA) systems, such as IS-2000, and Orthogonal Frequency Division Multiplexing (OFDM) systems, such as IEEE 802.11 a wireless local area network (LAN), may employ an embodiment of the present invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

The cost of missed or erroneous detection of Heartbeat (HB) and Heartbeat with Request to Go Active (HB/RQST) signals is costly. If a false detection occurs for HB, power control commands and timing commands used between a base station and field terminal may be generated based on a received code phase that is not correct. Thus, the power control can be erroneous and not based on the actual received power from the terminal. For the request message, resources will be assigned to a user when the resources are not needed, which results in wasted capacity.

Traditionally, if a very low probability of false detection is important, a requirement of a very high Eb/No (i.e., energy-per-bit per noise density) threshold at the Base Transceiver Station (BTS) is imposed. As an alternative, if the speed of detection is less important, as in the case of the HB signal, multiple successive detections may be useful. This allows the probability of false detection to be greatly reduced.

For instance, if the P(fd)=0.01 and if three detections in a row is specified to be made before a "Valid Detection" is determined, the overall P(fd)=(0.01)^3 or 0.000001. This is less costly for detection as the probability is much higher to start with. For instance, if the single detection probability is 0.9, requiring three detections lowers the detection probability to 0.9^3 or 0.72, only a slight reduction. This technique is known in radar systems, but has not been used in this application for detecting HB and HB/RQST signals and other communications systems and applications. It should be understood that the HB and HB/RQST signals are examples of signals to which the teachings of the present invention may be applied and not intended to be limiting in any way.

The signals to be detected and counted (i) may be successive—either in time or by user allocated slot in a TDMA system, for example—or (ii) may have breaks between the signals but have a given number of pulses, bits, or other indicators in a given time interval. For a CDMA reverse link, requiring multiple serial detections or non-serial detections may be used to qualify as a system level detection. Further, the system may set a different power control target versus a detection target, which means that for a lower transmission power, integration time is increased to increase energy for detection. For a system that uses time slots, the system may include intelligence to monitor successive or non-successive time slots for the given user. In addition, the system works on gated and non-gated signals.

The interference level of the heartbeats is derived as a classical RADAR detection problem. To this end, the benefits are made possible based on the heartbeat pulses being "detected" rather than being demodulated as in the case with the Dedicated Control Channel (DCCH) and Slotted Control Hold Mode (DCHM) in CDMA technology.

Figure 1:
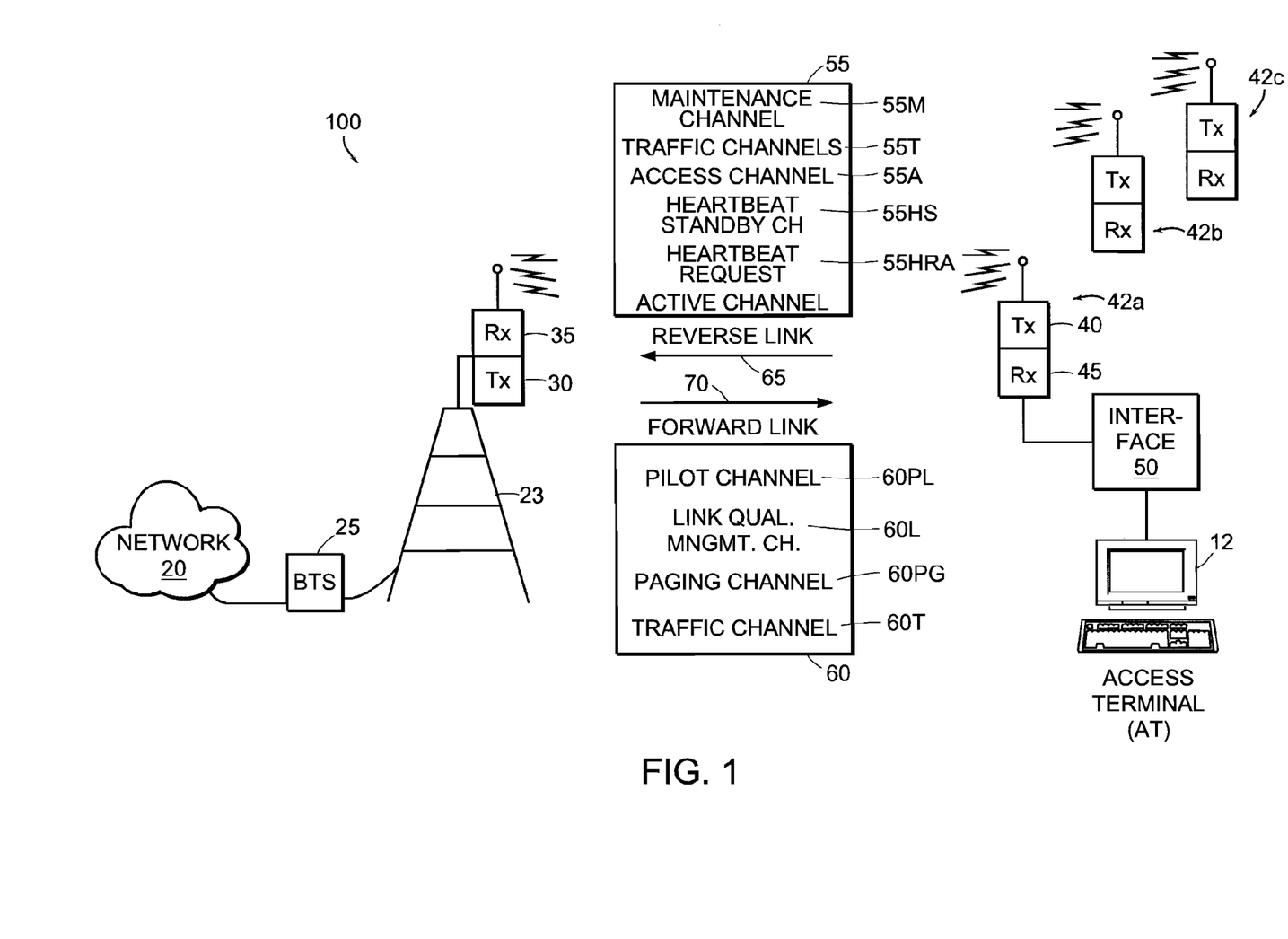
FIG. 1 is a schematic diagram of a communications system in which in an embodiment of the present invention may be deployed.

FIG. 1 is a diagram of an example communications system 100, similar to the system described above, employing an embodiment of the present invention. A base transceiver station (BTS) 25 with antenna tower 23 maintains wireless communications links with each of a plurality of field units 42a, 42b, 42b (collectively, field units 42) as shown. Such wireless links are established based upon assignment of resources on a forward link 70 and a reverse link 65 between the base station 25 and field units 42. Each link 65 or 70 is typically made up of several logical reverse link channels 55 and several logical forward link channels 60, respectively.

As shown, the communications system 100 supports wireless communications between an interface 50 and a network 20. Typically, the network 20 is a Public Switched Telephone Network (PSTN) or computer network, such as the Internet, internet, or intranet. The interface 50 is preferably coupled to a digital processing device, such as a portable computer 12, sometimes referred to as an access unit, to provide wireless access to the network 20. Consequently, the portable computer 12 has access to the network 20 based on communications over a combination of both hard-wired and wireless data links.

In a preferred embodiment, the forward link channels 60 and reverse link channels 55 are defined in the communications system 100 as Code Division Multiple Access (CDMA) channels. That is, each CDMA channel is preferably defined by encoding and transmitting data over the channel with an augmented pseudo random noise (PN) code sequence. The PN coded data is then modulated onto a radio frequency carrier. This enables a receiver to decipher one CDMA channel from another knowing only the particular augmented PN code assigned for a given channel. In accordance with an embodiment, each channel preferably occupies a 1.25 MHZ band consistent with the IS-95 CDMA standard or 1xEV-DV standard and is capable of transmitting at 38.4 kbps.

A forward link 70 includes at least four, logical, forward link channels 60. As shown, this includes a Pilot Channel 60PL, Link Quality Management (LQM) channel 60L, paging channel 60PG and multiple traffic channels 60T.

The reverse link 65 includes at least five logical channels 55. As shown, this includes a heartbeat standby channel 55HS, heartbeat request active channel 55HRA, access channel 55A and multiple traffic channels 55T. Generally, the reverse link channels 55 are similar to the forward link channels 60 except that each reverse link traffic channel 60T can support variable data rates from 2.4 kbps to a maximum of 160 kbps.

Data transmitted between the base station 25 and field unit 42a typically include encoded digital information, such as web page data. Based on the allocation of multiple traffic channels in the reverse link 65 or forward link 70, higher data transfer rates can be achieved in a particular link between the base station 25 and field unit 42a. However, since the field units 42 compete for bandwidth allocation, a field unit 42a may have to wait until resources are free to be assigned traffic channels to transmit a data payload.

Before discussing an example detector system (FIG. 2) that can be used to distinguish a heartbeat from a heartbeat-with-request signal, a brief discussion of example signals will be discussed in reference to FIGS. 3A-3C.

Figure 3A:
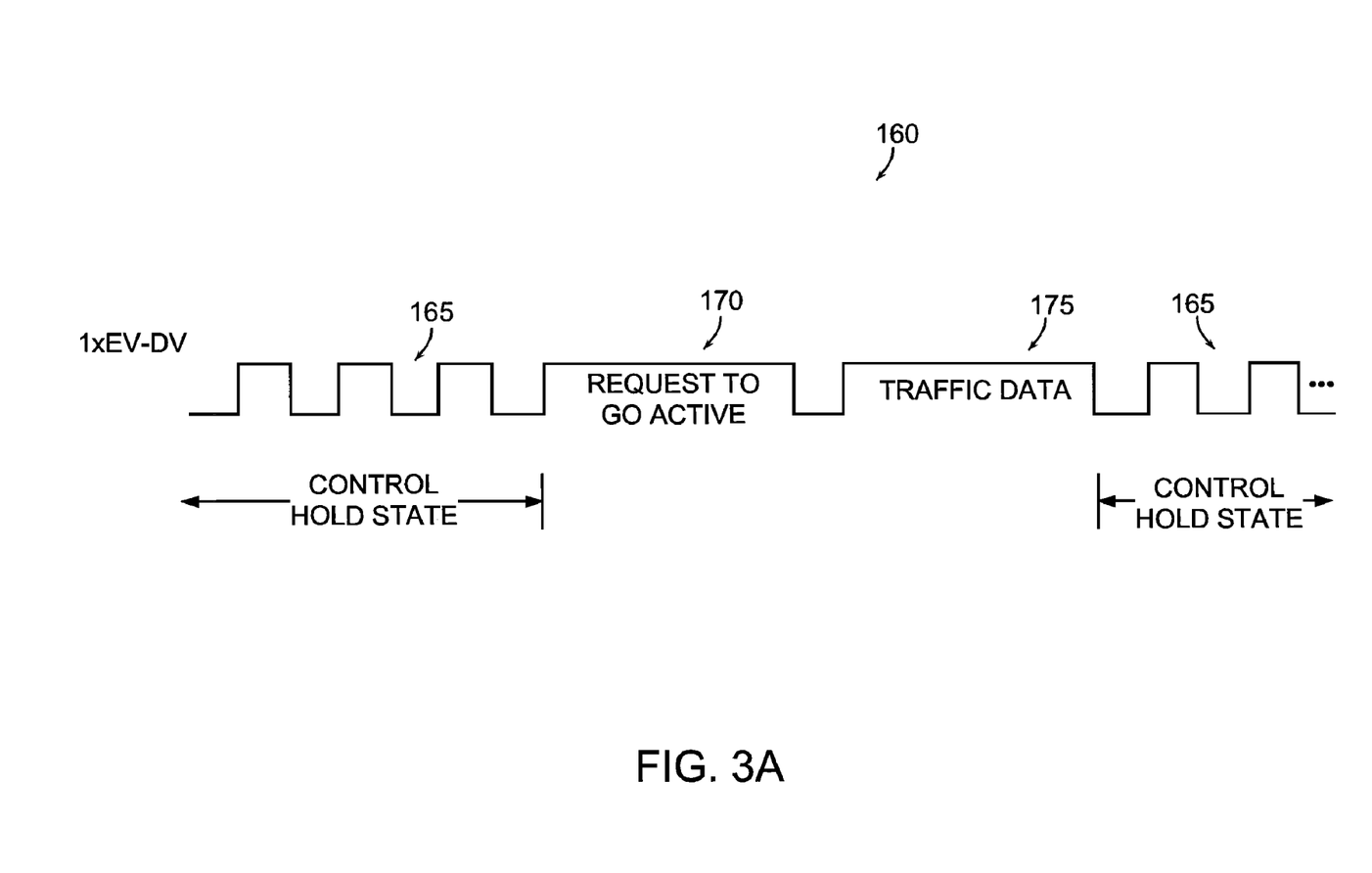
FIG. 3A is a signal diagram of a 1xEV-DV signal with a first marker indicating 'control hold' and a second marker indicating a 'request to go active'.

In FIG. 3A, a 1xEV-DV signal 160 that may be transmitted by the field unit is shown having three distinct states: a 'control hold' state 165, a 'request to go active' state 170, and a data traffic state 175. In the 'control hold' state 165, the signal 160 does not include a 'request to go active' indication. In other words, the signal 160 remains in an 'idle' or 'control hold' state, which indicates that the field unit 42a is not requesting traffic channels. The 'request to go active' state 170 is an indication that the field unit is requesting to transmit data on a traffic channel over a reverse link to the BTS 25. In the traffic state 175, traffic data is transmitted by the field unit to the BTS. Following transmission of the traffic data over the reverse link, the signal 160 reverts back to the 'control hold' state 165 following a transmission of a 'data transmission complete' state (not shown).

Although shown as a single signal 160, it should be understood that the signal may be multiple signals, optionally coded with orthogonal or non-orthogonal codes into mutually exclusive channels. For example, the 'control hold' state 165 may be transmitted on a different channel from the 'request to go active' state 170. Similarly, the traffic data transmitted in a transmit state 175 may be on a separate channel from the other two states 165, 170. An example of multiple channel is discussed in reference to FIGS. 3B and 3C.

Figure 3B:
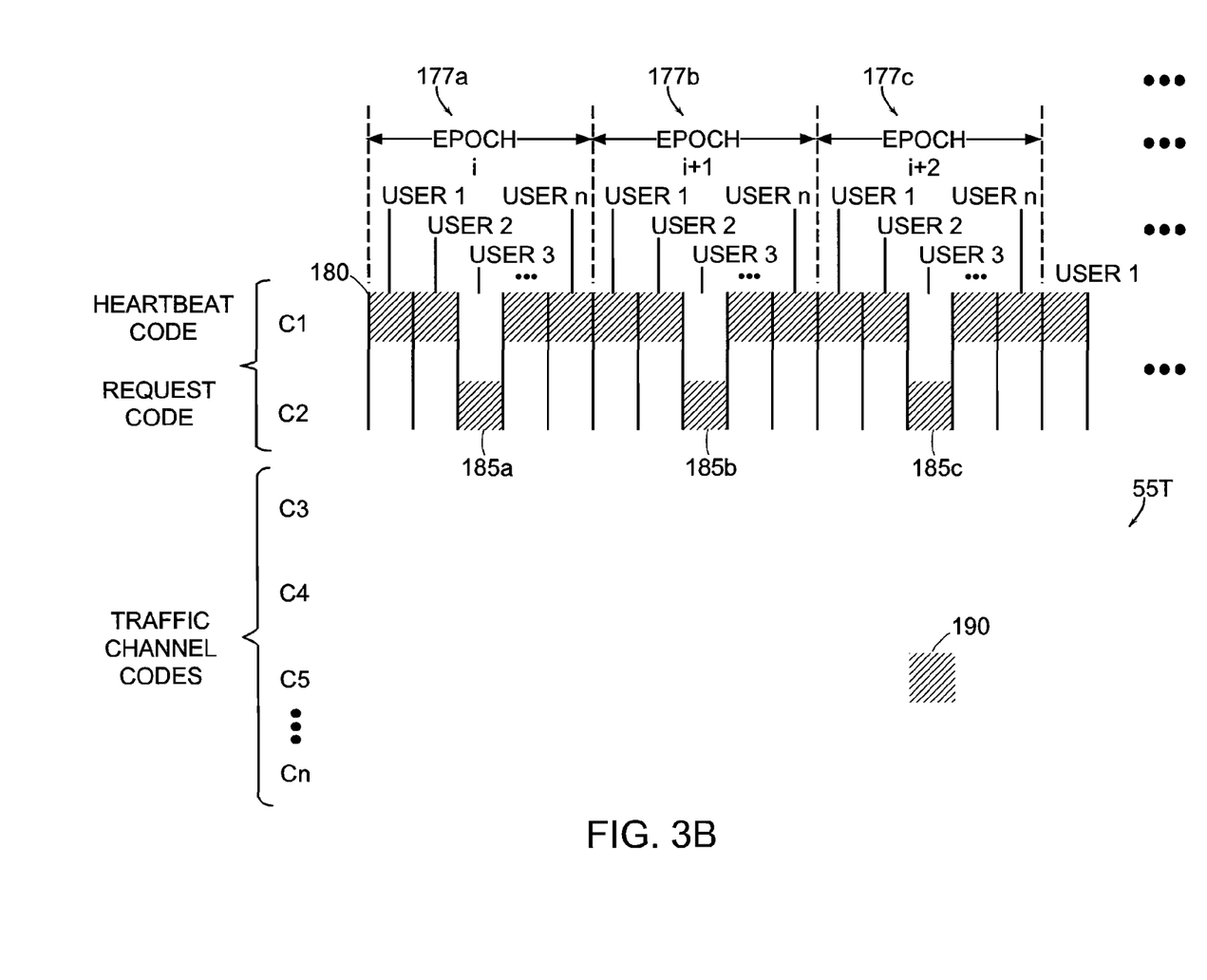
FIG. 3B is a signal diagram of a code division multiple access (CDMA) set of code channels having a marker in an assigned time slot that indicates that the field unit is requesting a change in communications states.

FIG. 3B is an example of an Internet code division multiple access (I-CDMA) signaling diagram that has assigned time slots for users 1, 2, 3, . . . , N repeating in epoch i 177a, epoch i+1 177b, and so forth. The channels are composed of the heartbeat channel 55H, request channel 55R, and traffic channels 55T. Each of these channels has an associated code C1, C2, C3, C4, . . . , CN, which allow signals to be transmitted on mutually exclusive code channels. Both the transmitting and receiving systems process the information in the channels by using the codes to separate the information respectively included therein in a typical CDMA manner.

In the example shown, users 1, 2, 4, 5, 6, . . . , N are requesting to remain in an idle state, indicated by the presence of a signal 180 in the heartbeat channel 55H. User 3, however, is requesting to transmit data over a reverse link based on a signal 185 in the request channel 55R in the first epoch 177a, a signal 185b in the request channel 55R in the second epoch 177b, and possibly additional epochs. In the third epoch 177c, the BTS 25 has detected the request to transmit data based on the two consecutive indications 185a and 185b. Following receipt of an acknowledgment, user 3 begins to transmit traffic data 190 in an associated traffic channel using code C5. In an alternative embodiment, the BTS 25 may require three consecutive indications 185a through 185c before determining that a request is being made and acknowledging same.

Figure 3C:
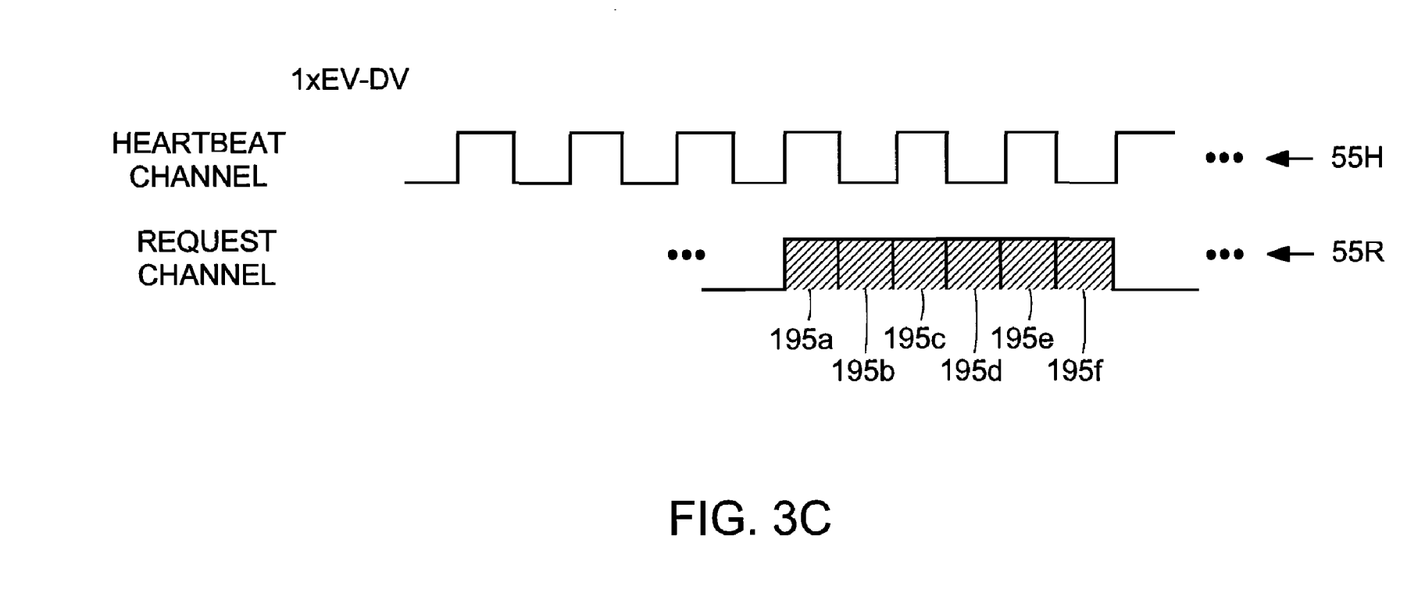
FIG. 3C is a signal diagram of an alternative embodiment of a reverse link signal having the indications.

FIG. 3C is a more detailed signal diagram of the 1xEV-DV signal of FIG. 3A that is used to indicate a 'request to go active' to the base station 25 from the field unit 42a. In this embodiment, the 1xEV-DV signal is composed of multiple signals on different logical channels: a heartbeat channel 55H and a request channel 55R. The heartbeat channel 55H provides continuous timing and other information (e.g., power level, synchronization, etc.) from the field unit 42a to the base station 25. The field unit 42a uses the request channel 55R to make a request (e.g., digital "1") of the base station 25 to request a traffic channel on the reverse link 65 for transmitting data.

Sampling times 195*a*, 195*b*, ..., 195*f* (collectively 195) denoted by arrows indicate times or intervals at which the BTS 25 samples the time slots of the request signal 55R and, optionally, the heartbeat channel 55H to determine whether a request for a traffic channel is being made. It should be understood that the sampling may occur over the entire time slot or a subset thereof. Also, the heartbeat channel 55H and request channel 55R use mutually exclusive codes, in this particular embodiment, so the sampling is performed on their mutually exclusive code channels 55H, 55R in all or a subset of time slots. In one particular embodiment, the base station 25 samples mutually exclusive code channels 55H, 55R in time slots designated for request indications, such as in time slots at sampling times 195*b*, 195*d*, and 195*f*. During these time slots, the heartbeat channel 55H is "inactive", but the request channel 55R is "active".

As discussed above, the signals in the "active" request time slots may be modulated messages or simply coded pilot signals with no "bits". Thus, detection may be based solely on the respective energy levels of the heartbeat and heartbeat-with-request signals in respective time slots over a given time interval or spanning several time intervals.

In one particular embodiment, the 'control hold' state 165 indication has a first energy level, and the 'request to go active' state 170 has a second energy level. The base station 25 may take advantage of the difference in power levels in addition to the repetition of the pulses used to indicate a request to go active. For example, in this particular embodiment, distinguishing the two states may be a matter of measuring energy levels of the signals(s) and (i) comparing the energy levels against at least one threshold or (ii) determining that a request is present, optionally in a mutually exclusive code channel in time slots when the heartbeat signal is at a logical zero. The different energy levels of the indications may be provided by the duty cycle of the signals, frequency of the signals, power of the signals, signaling structure, and so forth.

Figure 4:
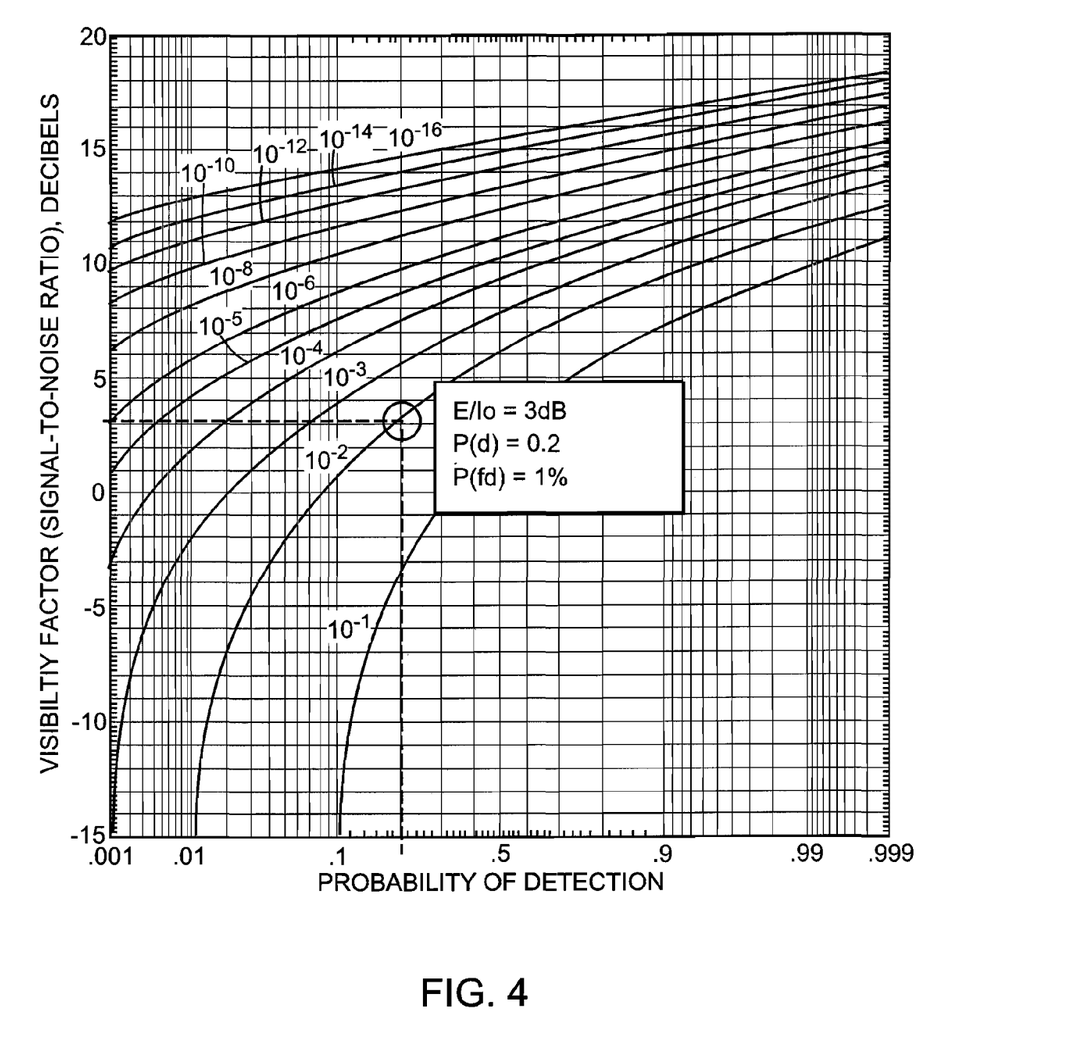
FIG. 4 is a plot of signal-to-noise ratio versus probability of detection that may be used in determining energy levels of the indications in the signals of FIGS. 3A-3C.

To understand how the energy levels of the signals can be used to improve system performance, on can refer to FIG. 4, which provides a chart for selecting signaling requirements based on the following parameters or factors: (i) probability of detection, P(d) (x-axis), (ii) signal-to-noise ratio in decibels (y-axis), and (iii) probability of false detection, P(fd) (curves in the chart). This chart shows a required signal-to-noise ratio at the input terminals of a linear-rectifier detector as a function of probability of detection for a single pulse, with the false-alarm probability P(fd) as a parameter, calculated for a non fluctuating signal. It should be understood that alternative parameters or factors may be used to establish or define the transmitted power levels of the indications.

At the circled point 200, the signal-to-noise ratio is 3 dB, P(d)=20%, and P(fd)=1%. To increase the probability of detection for the same probability of false detection, one simply needs to slide the circled point 200 upward along the same probability of false detection curve, which suggests that an increase in the signal-to-noise ratio is used to improve system performance and, thus, improving the likelihood that the request signal will be detected quickly.

Before providing an example model and discussion regarding example Heartbeat standby 55HS and Heartbeat Request Active 55HRA energy levels for the example communications system 100 (FIG. 1), a brief discussion of a processor and detector that may be used in the system is now provided.

Figure 2A:
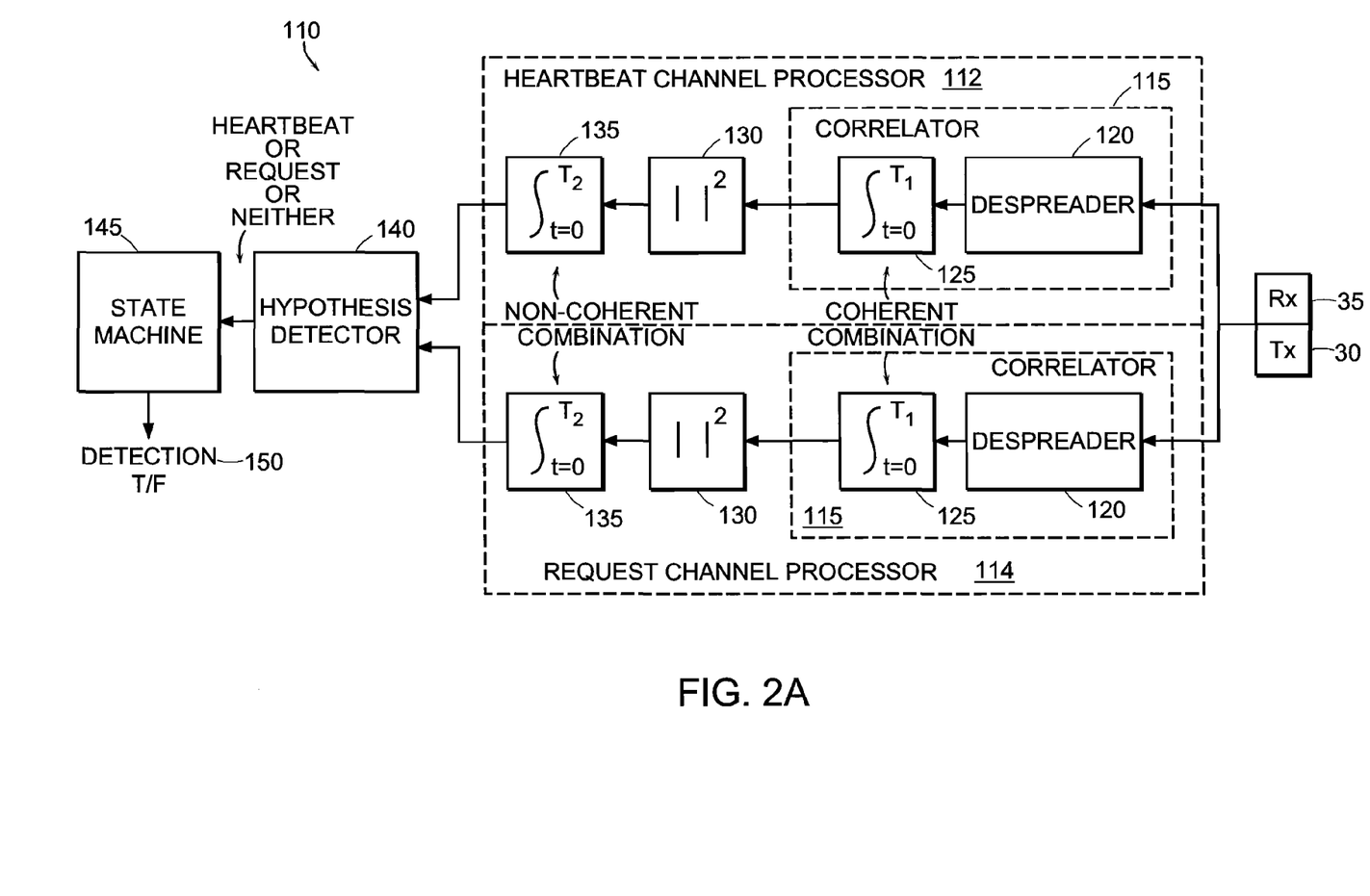
FIG. 2A is a schematic diagram of a subsystem employed by a base station in the communications system of FIG. 1 used to determine whether a reverse link signal includes an indication for a request to change communications states.

FIG. 2A is a schematic diagram of a request detection processor 110 used to determine whether the field unit 42*a* has requested to send data to the BTS 25. The receiver Rx 35 receives signals 55, which includes the maintenance channel 55M, traffic channels 55T, access channel 55A, heartbeat standby channel 55HS, and heartbeat request active channel 55HRA. The signal 55 is processed such that a heartbeat channel processor 112 receives the heartbeat standby channel 55HS and a request channel processor 114 receives the Heartbeat Request Active channel 55HRA.

The heartbeat channel processor 112 and request channel processor 114 include the same processing elements, in this particular embodiment, so a discussion of just the heartbeat channel processor 112 will be provided for brevity.

The heartbeat channel processor 112 receives the heartbeat standby channel 55HS. A correlator 115 uses a despreader 120 to despread the heartbeat standby channel 55HS. An integrator 125 is used to coherently combine the heartbeat signal. By coherently combining the signal, an integration of I, Q and its phase causes the phase of the signal to be removed and output the power of the signal.

Following the correlator 115, a rectifier 130 (i.e., absolute value of the signal squared) rectifies the power of the signal, which is then integrated by a second integrator 135 to calculate the energy of the received heartbeat signal. The second integrator 135 provides non-coherent combination of the signal, which is calculated over short time intervals. The non-coherent integration provides just magnitudes if the terminal is moving too fast, thus causing a cross-over of the 180-degree phase point, which can cause ambiguities in determining the energy of the signal in the absence of the non-coherent combination.

The output from the heartbeat channel processor 112 is a heartbeat energy level, and the output from the request channel processor 114 is a request energy level. Each of these energy levels, in this particular embodiment, is fed to a hypothesis detector 140, which determines whether a heartbeat signal, request signal, or neither signal is in the signal 55 received by the base station 25.

The output from the hypothesis detector 140 is provided to a state machine 145. The state machine is used to determine whether the field unit is making a 'request to go active' according to a given criteria, where, in one particular embodiment, is a measurement of the output from the hypothesis detector 140. Example measurements include counting the number of consecutive request signals, measuring a ratio of heartbeat standby channel signals and heartbeat request active channel signals, counting heartbeat request active signals in a given time span, and so forth. Further, the hypothesis detector 140 and the difference in energy levels of the indications improves system performance, but are not required for the present invention. In other words, the heartbeat standby channel 55HS and heartbeat request active channel 55HRA may be processed directly by the state machine 145 to determine whether the field unit 42*a* is requesting to go active. More detail is provided following a description of an embodiment of the state machine 145.

In this particular embodiment, the state machine 145 outputs a Boolean true or false signal. An example of a process executed by the state machine is depicted in FIG. 2B.

Figure 2B:
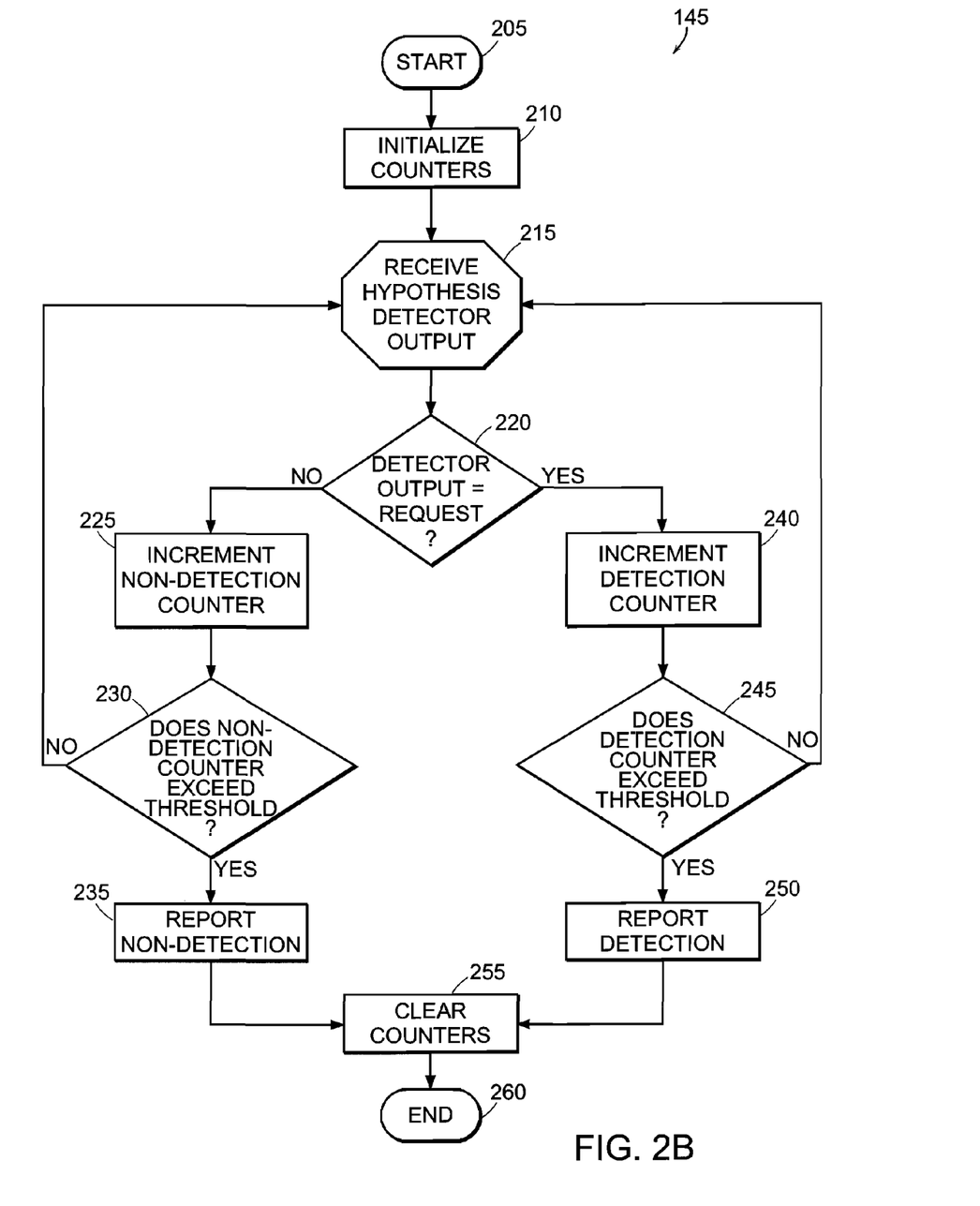
FIG. 2B is a flow diagram of a process executed by a state machine in the subsystem of FIG. 2A.

FIG. 2B is an example flow diagram of the state machine 145. The example state machine 145 starts in step 205 when the detection processor 110 "boots up." In step 210, the state machine 145 initializes counters that are used to determine if a detection has occurred. In step 215, the state machine 145 receives the output from the hypothesis detector 140. After boot up, the state machine 145 may act as an 'interrupt service routine', beginning in step 215, upon receipt of any output from the hypothesis detector 140. The counters are cleared (i.e., set to zero) upon a determination of a detection or a non-detection to reset the measurement process without a re-boot of the detection processor 110, as discussed below.

Following receipt of the output from the hypothesis detector 140 in step 215, the state machine 145 determines whether the output of the hypothesis detector 145 is a request (i.e., 'request to go active'). If yes, then the state machine 145 continues in step 240 in which a detection counter is incremented. In step 245, the detection counter is compared against a threshold. If the detection counter exceeds the threshold, then, in step 250, the state machine 145 reports a detection of a 'request to go active' from the field unit 42a. If the detection counter does not exceed the threshold, then the state machine 145 returns to step 215 and waits to receive another output from the hypothesis detector 140.

Continuing to refer to FIG. 2B, if, in step 220, the output of the hypothesis detector 140 is determined not to be a 'request', then the state machine 145 continues in step 225. In step 225, the state machine 145 increments a non-detection counter. In step 230, a determination is made as to whether the non-detection counter exceeds a threshold. If yes, then the state machine 145 continues in step 235, in which the state machine 145 reports a non-detection of a 'request to go active' by the field unit 42a. If the non-detection counter does not exceed the threshold, then the state machine 145 continues in step 215.

Following steps 235 and 250, the state machine 145 clears the counters in step 255, allowing the state machine 145 to detect future 'requests to go active' by the field unit 42a. In step 260, the state machine 145 ends.

The detection counter is used by the state machine 145 to determine how many indications of a 'request to go active' have been received by the detection processor 110 according to a given criteria. The criteria can be of any form, including a given number of consecutive detections, a given number of detections in a given time span, or a ratio of detections to non-detections. Alternative non-counting based measurements may be employed to determine whether a request is being made to go active, such as measuring the phase of the request signals.

It should be understood that alternative embodiments of using counters or other criteria may be used by the state machine 145. For example, the state machine 145 may use other process flows, non-counter variables, or other standard or non-standard techniques for determining a detection. Further, rather than receiving the output from the hypothesis detector 140, the input to the state machine 145 may be raw data from the heartbeat channel processor 112 or request channel processor 114. Further, in an alternative embodiment, the state machine 145 may be included in combination with the hypothesis detector 140.

Referring again to FIG. 2A, in addition to using the state machine 145 to ascertain with high probability whether the field unit 42a is making a 'request to go active', the hypothesis detector 140 is also employed.

To determine which signal(s) is/are present, the hypothesis detector 140 includes logical functions. For example, in this particular embodiment, the hypothesis detector 140 compares a first energy level threshold against the first energy level (i.e., heartbeat energy level) and compares a second energy level threshold against the second energy level (i.e., request energy level).

Example energy level thresholds against which to compare the heartbeat energy level and the request energy level are 9 dB and 11 dB, respectively. The energy level thresholds may be dynamically selected, predetermined, or applied in another manner, such as based on a transmitted power level, which may be reported by the field unit to the base station over the heartbeat standby channel 55HS, for instance. In the case of the energy level calculation and comparison, the first and second energy levels may be dependent on occupancy of time slots in the signaling channel(s) used by the signal 55, so the energy level thresholds can be based on an expected or specified number of "1" bits used to indicate a 'request to go active' or to indicate a request to remain in idle mode. Use of the energy level thresholds is discussed in related U.S. patent application entitled "Transmittal of heartbeat Signal at a lower than heartbeat Request," by Proctor, J., filed concurrently herewith, the entire teachings of which are incorporated herein by reference.

As discussed above, the output of the hypothesis detector 140 is measured by the state machine 145 determine whether to change the state of the communications system, which is the state of reverse link traffic channels between the field unit 42a and the base station 25. For example, if the hypothesis detector 140 determines that a 'request to go active' (i.e., send a data transmission on the reverse link) is being made by the field unit 42a, then the state machine 145 outputs a signal to a processor (not shown) in the BTS 25 that is responsible for providing the portable computer 12 with a traffic channel 55T. In one particular embodiment, the BTS 25 allocates the traffic channel 55T if the number of consecutive request signals is determined to be two or more consecutively. Alternative criteria have been discussed above.

As described in reference to FIG. 3C, the heartbeat channel processor 112, request channel processor 114, and hypothesis detector 140 may be configured or designed in a manner that monitors an occupancy of time slots used to indicate the request to change communications states. In one embodiment, the detecting includes monitoring occupancy of mutually exclusive code channels, such as shown in FIGS. 3B and 3C.

A feedback loop (not shown) may be employed to cause the heartbeat channel processor 112 and request channel processor 114 to be "adaptive". For example, based on the received energy level of the heartbeat channel 55H, the integration time of the integrators 125, 135 may be adjusted, and the energy level thresholds used by the hypothesis detector 140 for comparison of the energy levels of the heartbeat and request signals may also be adjusted by the feedback loop. Other feedback may cause (i) the number of consecutive pulses required for a detection to be increased or decreased or (ii) the number of transmitted request signals to be increased or decreased. Such a feedback loop may use a command or message to transfer information between the BTS 25 and field unit 42a that includes information regarding the pulse repetitions or power levels of the heartbeat and heartbeat-with-request signals transmitted by the field unit 42a.

As discussed above, the first communications state may be a standby state and the second communications state may be a payload state. In other systems or even the same system, the communications states may refer to other communications states, such as a request to change base stations, power control signaling, and so forth. The use of different signal repetitions or energy levels in signaling as described herein is applicable to wireless, wired, or optical communications systems. In either case, the communications states may be used in voice or data communications systems.

As also discussed above, the second energy level may be based on a target probability of detection, false detection, or combination of both as discussed in reference to FIG. 4. In other words, the field unit may transmit the request signal at a given power level or a given number of pulses per given time period to achieve a corresponding signal-to-noise ratio for a given target probability of detection, false detection, or both as discussed in reference to FIG. 4.

An analysis may be used to set the transmission power or number of transmitted indications, or the feedback mechanism discussed above may be employed in the communications system for causing the field unit to change its behavior so as to have the received energy levels of the indications achieve a predetermined signal-to-noise ratio, thus providing the desired probability of detection and false detection parameters.

Simulation

A simulation for a reverse link was conducted where the reverse link is assumed to have power control and a heartbeat channel of any of the example types shown in FIGS. 3A-3C or another type of communications link signaling.

First, there are two assumptions that have been made for this simulation. First, power control is used on a combination of detected paths or in a single path. Power control is performed even when a positive detection is not achieved. Second, the probability of detection was set to achieve detection at a high enough rate to ensure that power control is performed on the correct signal. To clarify, detection is required to track the received signal.

Table 1 shows the rate of detection required for a single path channel from a vehicle moving away from the base station at 60 mph. This table requires that there is at least one detection per slew of a chip due to movement.

TABLE 1

| | |
|---|---|
| Slew Distance for 1 chip | 814 ft |
| Handset Velocity | 60 mph |
| Handset Velocity | 88 ft/s |
| Chip Slew Rate | 9.2 chips/s |
| Heartbeat Rate | 50 HB/s |
| Heartbeats/Td | 462 |

In Table 1, the time period Td is defined as the period over which a single heartbeat pulse must be detected to ensure the signal is tracked as the time of arrival of the signal is skewed due to movement of the vehicle. Table 1 shows that one out of every 462 pulses must be received with a very high probability or there is a risk of losing the tracking of the signal.

Based on this calculation, the threshold of detection was set from a table of detection/false detection probabilities (e.g., FIG. 4). While Table 1 is defined for Additive White Gaussian Noise (AWGN), it is expected that the probabilities of detection are not greatly affected over a relatively short amount of time. This is due to the statistical independence of the fading from heartbeat pulse to heartbeat pulse.

While the individual pulse probabilities of detection varied significantly, the overall results were not seen to vary significantly by more than a factor of roughly 50% in the latency of detection. Specifically, the average detection latency for the request message in AWGN was 11 ms as compared to roughly 15 ms for 30 km/hr. Again, this result is due to requiring a detection process rather than a more difficult demodulation process.

Based on this analysis, a probability of detection of 20% and false detection of 1% was selected. This requires an average Eb/No of 3 dB. This is shown and discussed in reference to FIG. 4.

Table 2 shows a calculation of the probability of detection and false detection during the time Td defined above.

TABLE 2

| | |
|---|---|
| Target E/Io (entire energy/interference density) | 3 dB |
| Probability of detection | 0.2 |
| Probability of false detection | 0.01 |
| Probability of detection for 3 Sequential HB | 8.00E-03 |
| Number of trials in Td | 462 |
| Probability of no detection in Td | 2.44E-02 |
| Probability of false detection for 3 sequential | 1.00E-06 |
| Required no false detection trials | 462 |
| Probability of false detection for Td | 4.62E-04 |

To reduce the probability of false detection, three sequential detections were required to validate a single detection. Since the probability of false detections is multiplicative in this case, the probability of a single false detection is cubed.

Table 3 below calculates the average Ec/Io (energy-per-chip per the interference density, which is the SNR integrated over the entire chip) required to achieve the statistics of Table 2.

TABLE 3

| | |
|---|---|
| Target E/Io | 3 dB |
| Processing Gain | 256 |
| Burst Ec/Io | −21.08 dB |
| Average Ec/Io | −40.9 dB |

Since the heartbeat channel is time division multiplexed (TDM) in structure, the interference to all other users due to heartbeat users increases as follows:

Effective average Ec/Io (all HB users)=10* log10(N)−40.9, where N is the number of users.

Thus, for 96 users of a given base station, the average total interference will equal the burst Ec/Io or −21.08 dB.

While this invention has been particularly shown and described with references to preferred embodiments thereof, it will be understood by those skilled in the art that various changes in form and details may be made therein without departing from the scope of the invention encompassed by the appended claims.

What is claimed is:

1. A wireless transmit receive unit (WTRU) comprising:
a selector configured to select indications associated with a communication state to include in a signal, wherein the indications are multiplexed in a time slot before being included in the signal;
a transmitter configured to transmit the signal to a base station, wherein the signal includes a maintenance channel, a plurality of traffic channels, an access channel, a heartbeat standby channel, and a heartbeat request active channel; and
a receiver configured to receive at least one allocated traffic channel from the base station when the transmitted signal is a request to transmit data according to predetermined criteria.

2. The WTRU of claim 1 wherein the indications indicate that the WTRU is requesting to transmit data on a traffic channel to the base station.

3. The WTRU of claim 1 wherein the indications indicate that the WTRU is not requesting traffic channels.

4. The WTRU of claim 1 wherein the communication state is a control hold state.

5. The WTRU of claim 1 wherein the communication state is a request to transmit data state.

6. The WTRU of claim 1 wherein the communication state is a data traffic state.

7. The WTRU of claim 1 wherein the predetermined criteria is a power measurement.

8. The WTRU of claim 7 wherein the power measurement is used to determine when signal is a request to transmit data.

9. The WTRU of claim 8 wherein each indication has a different energy level and the difference in power levels is used to determine when the signal is a request to transmit data.

10. The WTRU of claim 1 wherein the predetermined criteria is based on a detection counter and a non-detection counter.

11. The WTRU of claim 10 wherein the detection counter and the non-detection counter are used to determine when the signal is a request to transmit data.

12. The WTRU of claim 11 wherein the detection counter is incremented and compared against a first threshold to determine if the signal is a request to transmit data.

13. The WTRU of claim 11 wherein the non-detection counter is incremented and compared against a second threshold to determine if the signal is a request to transmit data.

14. The WTRU of claim 1 wherein the WTRU is configured for code division multiple access (CDMA) operation.

15. The WTRU of claim 1 wherein the WTRU is configured for orthogonal frequency division multiplexing (OFDM) operation.

16. A base station comprising:
    a receiver configured for receive a signal including indications associated with a communication state from a wireless transmit receive unit (WTRU), wherein the signal includes a maintenance channel, a plurality of traffic channels, an access channel, a heartbeat standby channel, and a heartbeat request active channel;
    a detection processor, wherein the detection processor comprises
        a heartbeat processor configured to process the received heartbeat standby channel and output a heartbeat energy level,
        a request channel processor configured to process the received heartbeat request active channel and output a request energy level,
        a hypothesis detector configured to receive the heartbeat energy level and the request energy level and determine the signal type of the received signal, and
        a state machine configured to receive the output from the hypothesis detector and determine whether the received signal is a request to transmit data using a power measurement of the output received from the hypothesis detector, wherein the heartbeat energy level is compared against a first energy threshold and the request energy level is compared against a second energy threshold to determine if the received signal is a request to transmit data; and
    a processor configured to allocate at least one traffic channel to the WTRU when the received signal is a request to transmit data.

17. The base station of claim 16 wherein the energy thresholds are dynamically selected using a feedback loop.

18. The base station of claim 16 wherein the energy thresholds are predetermined.

19. The base station of claim 16 wherein the indications indicate that the WTRU is requesting to transmit data on a traffic channel to the base station.

20. The base station of claim 16 wherein the indications indicate that the WTRU is not requesting traffic channels.

21. The base station of claim 16 wherein the allocating at least one traffic channel to the WTRU only occurs when detecting two or more requests to transmit data.

22. The base station of claim 16 wherein the state machine acts as an interrupt service routine upon receipt of any output from the hypothesis detector.

23. The base station of claim 16 wherein the heartbeat energy level and the requested energy level depend upon the occupancy of time slots in a traffic channel.

24. A base station comprising:
    a receiver configured for receive a signal including indications associated with a communication state from a wireless transmit receive unit (WTRU), wherein the signal includes a maintenance channel, a plurality of traffic channels, an access channel, a heartbeat standby channel, and a heartbeat request active channel;
    a detection processor, wherein the detection processor comprises
        a heartbeat processor configured to process the received heartbeat standby channel and output a heartbeat energy level,
        a request channel processor configured to process the received heartbeat request active channel and output a request energy level,
        a hypothesis detector configured to receive the heartbeat energy level and the request energy level and determine the signal type of the received signal, and
        a state machine configured to receive the output from the hypothesis detector and determine whether the received signal is a request to transmit data using a detection counter and a non-detection counter in the state machine, wherein the detection counter is incremented and compared against a first threshold and the non-detection counter is incremented and compared against a second threshold to determine if the received signal is a request to transmit data from the WTRU; and
    a processor configured to allocate at least one traffic channel to the WTRU when the received signal is a request to transmit data.

25. The base station of claim 24 wherein the thresholds are predetermined.

26. The base station of claim 24 wherein the indications indicate that the WTRU is requesting to transmit data on a traffic channel to the base station.

27. The base station of claim 24 wherein the indications indicate that the WTRU is not requesting traffic channels.

28. The base station of claim 24 wherein the allocating at least one traffic channel to the WTRU only occurs when detecting two or more requests to transmit data.

29. The base station of claim 24 wherein the state machine acts as an interrupt service routine upon receipt of any output from the hypothesis detector.

30. A method for use in a wireless transmit receive unit (WTRU), the method comprising:
    selecting indications associated with a communication state to include in a signal, wherein the indications are multiplexed in a time slot before being included in the signal;
    transmitting the signal to a base station, wherein the signal includes a maintenance channel, a plurality of traffic channels, an access channel, a heartbeat standby channel, and a heartbeat request active channel; and
    receiving at least one allocated traffic channel from the base station when the transmitted signal is a request to transmit data according to predetermined criteria.

31. The method of claim 30 wherein the indications indicate that the WTRU is requesting to transmit data on a traffic channel to the base station.

32. The method of claim 30 wherein the indications indicate that the WTRU is not requesting traffic channels.

33. The method of claim 30 wherein the communication state is a control hold state.

34. The method of claim 30 wherein the communication state is a request to transmit data state.

35. The method of claim 30 wherein the communication state is a data traffic state.

36. The method of claim 30 wherein the predetermined criteria is a power measurement.

37. The method of claim 36 wherein the power measurement is used to determine when signal is a request to transmit data.

38. The method of claim 37 wherein each indication has a different energy level and the difference in power levels is used to determine when the signal is a request to transmit data.

39. The method of claim 30 wherein the predetermined criteria is based on a detection counter and a non-detection counter.

40. The method of claim 39 wherein the detection counter and the non-detection counter are used to determine when the signal is a request to transmit data.

41. The method of claim 40 wherein the detection counter is incremented and compared against a first threshold to determine if the signal is a request to transmit data.

42. The method of claim 40 wherein the non-detection counter is incremented and compared against a second threshold to determine if the signal is a request to transmit data.

43. The method of claim 30 wherein the WTRU is configured for code division multiple access (CDMA) operation.

44. The method of claim 30 wherein the WTRU is configured for orthogonal frequency division multiplexing (OFDM) operation.

45. A method for use in a base station, the method comprising:
receiving a signal including indications associated with a communications state from a wireless transmit receive unit (WTRU), wherein the signal includes a maintenance channel, a plurality of traffic channels, an access channel, a heartbeat standby channel, and a heartbeat request active channel;
processing the received heartbeat standby channel and outputting a heartbeat energy level;
processing the received heartbeat request active channel and outputting a request energy level,
determining the signal type of the received signal using the heartbeat energy level and the request energy level;
determining whether the received signal is a request to transmit data using a power measurement of the output received from the hypothesis detector, wherein the heartbeat energy level is compared against a first energy threshold and the request energy level is compared against a second energy threshold to determine if the received signal is a request to transmit data; and
allocating at least one traffic channel to the WTRU when the received signal is a request to transmit data.

46. The method of claim 45 wherein the energy thresholds are dynamically selected using a feedback loop.

47. The method of claim 45 wherein the energy thresholds are predetermined.

48. The method of claim 45 wherein the indications indicate that the WTRU is requesting to transmit data on a traffic channel to the base station.

49. The method of claim 45 wherein the indications indicate that the WTRU is not requesting traffic channels.

50. The method of claim 45 wherein the allocating at least one traffic channel to the WTRU only occurs when detecting two or more requests to transmit data.

51. The method of claim 45 wherein the state machine acts as an interrupt service routine upon receipt of any output from the hypothesis detector.

52. The method of claim 45 wherein the heartbeat energy level and the requested energy level depend upon the occupancy of time slots in a traffic channel.

53. A method for use in a base station, the method comprising:
receiving a signal including indications associated with a communications state from a wireless transmit receive unit (WTRU), wherein the signal includes a maintenance channel, a plurality of traffic channels, an access channel, a heartbeat standby channel, and a heartbeat request active channel;
processing the received heartbeat standby channel and outputting a heartbeat energy level;
processing the received heartbeat request active channel and outputting a request energy level,
determining the signal type of the received signal using the heartbeat energy level and the request energy level;
determining whether the received signal is a request to transmit data using a detection counter and a non-detection counter in the state machine, wherein the detection counter is incremented and compared against a first threshold and the non-detection counter is incremented and compared against a second threshold to determine if the received signal is a request to transmit data from the WTRU; and
allocating at least one traffic channel to the WTRU when the received signal is a request to transmit data.

54. The method of claim 53 wherein the thresholds are predetermined.

55. The method of claim 53 wherein the indications indicate that the WTRU is requesting to transmit data on a traffic channel to the base station.

56. The method of claim 53 wherein the indications indicate that the WTRU is not requesting traffic channels.

57. The method of claim 53 wherein the allocating at least one traffic channel to the WTRU only occurs when detecting two or more requests to transmit data.

58. The method of claim 53 wherein the state machine acts as an interrupt service routine upon receipt of any output from the hypothesis detector.

* * * * *

UNITED STATES PATENT AND TRADEMARK OFFICE
CERTIFICATE OF CORRECTION

| | | |
|---|---|---|
| PATENT NO. | : 7,394,791 B2 | Page 1 of 1 |
| APPLICATION NO. | : 10/171378 | |
| DATED | : July 1, 2008 | |
| INVENTOR(S) | : James A. Proctor, Jr. | |

It is certified that error appears in the above-identified patent and that said Letters Patent is hereby corrected as shown below:

At column 5, line 18, before the word "(collectively" delete "42b" and insert therefor --42c--.

At column 5, line 62, before the word "encoded" delete "include" and insert therefor --includes--.

At column 7, line 38, before the words "can refer" delete "on" and insert therefor --one--.

At column 10, line 8, after the word "Proctor" delete "J.," and insert therefor --Jr.,--.

At column 10, line 12, before the word "determine" insert --to--.

At column 10, line 58, before the word "case" delete "either" and insert therefor --any--.

At claim 16, column 13, line 27, after the word "configured" delete "for" and insert therefor --to--.

At claim 24, column 14, line 8, after the word "configured" delete "for" and insert therefor --to--.

Signed and Sealed this

Ninth Day of February, 2010

David J. Kappos
*Director of the United States Patent and Trademark Office*